United States Patent
De Ponti et al.

(10) Patent No.: US 7,177,479 B2
(45) Date of Patent: Feb. 13, 2007

(54) LOSS-LESS COMPRESSION OF STILL IMAGES AT ENHANCED SPEED

(75) Inventors: Mauro De Ponti, Seregno (IT); Marco Ferretti, Pavia (IT); Matteo Boffadossi, Garlasco (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 838 days.

(21) Appl. No.: 10/424,141

(22) Filed: Apr. 25, 2003

(65) Prior Publication Data

US 2004/0213471 A1    Oct. 28, 2004

(51) Int. Cl.
  *G06K 9/36* (2006.01)
  *G06K 9/68* (2006.01)
(52) U.S. Cl. .................................................. 382/245
(58) Field of Classification Search ................ 382/172, 382/181, 218–220, 232, 233, 238, 244–245, 382/246, 305; 341/50, 59, 63, 65; 375/240.01, 375/240.23, 240.25, 240.28
See application file for complete search history.

(56) References Cited

U.S. PATENT DOCUMENTS

| | | | | |
|---|---|---|---|---|
| 4,410,916 | A * | 10/1983 | Pratt et al. | 382/181 |
| 5,963,672 | A * | 10/1999 | Yajima et al. | 382/238 |
| 6,144,774 | A * | 11/2000 | Arakage et al. | 382/245 |
| 6,205,255 | B1 * | 3/2001 | Mak | 382/245 |
| 6,510,248 | B1 * | 1/2003 | Hsieh | 382/233 |
| 6,628,708 | B1 * | 9/2003 | Sampson | 375/240.01 |
| 6,657,561 | B1 * | 12/2003 | Hanna | 341/50 |

OTHER PUBLICATIONS

Weinberger et al., LOCO-I: A Low Complexity, Context Based, Lossless Image Compression Algorithm, Proc. of the 1996 Data Compression Conference (DCC '96), Snowbird, Utah, pp. 141-149, Mar. 1996.

Weinberger et al., The LOCO-I Lossless Image Compression Algorithm: Principles And Standardization Into JPEG-LS, IEEE Transactions on image processing, vol. 9 No. 8, pp. 1309-1324, Aug. 2000.

Klimesh et al., Hardware Implementation Of A Lossless Image Compression Algorithm Using A Field Programmable Gate Array, Feb. 15, 2001.

* cited by examiner

*Primary Examiner*—Amir Alavi
(74) *Attorney, Agent, or Firm*—Lisa K. Jorgenson; Allen, Dyer, Doppelt, Milbrath & Gilchrist, P.A.

(57) ABSTRACT

A method of compressing a stream of pixel data relative a two-dimensional object, pixels of which are scanned by rows from a source device to a receiver device, includes defining an extended context window to include a pair of pixels following a last encoded pixel on the row being scanned and the respective triplets of neighboring pixels belonging to the preceding row. The method includes defining a first distinct context array of pixels of the extended context window for the pixel of the pair immediately following the last encoded pixel, and a second context array of pixels of the extended context window for the other pixel of the pair. An extended context value relative to each pixel of the pair is calculated, and the extended context value relative to a first pixel immediately following the last encoded pixel is compared with an extended threshold. If the extended context value is less than the extended threshold, then encoding the first and second pixels of the pair, and if the extended context value relative to the first pixel of the pair exceeds the extended threshold, then carrying out simultaneously a parallel processing and encoding of both pixels according to an encoding routine.

32 Claims, 6 Drawing Sheets

| STANDARD PREDICTOR | N2C OPREDICTOR |

$$P_x = \begin{cases} \text{MIN}(A,B) & \text{se } C >= \text{MAX}(A,B) \\ \text{MAX}(A,B) & \text{se } C <= \text{MIN}(A,B) \\ A+B-C & \text{OTHERWISE} \end{cases}$$

$$P_{x1} = \begin{cases} \text{MIN}(A,B) & \text{se } C >= \text{MAX}(A,B) \\ \text{MAX}(A,B) & \text{se } C <= \text{MIN}(A,B) \\ A+B-C & \text{OTHERWISE} \end{cases}$$

$$P_{x2} = \begin{cases} \text{MIN}(A,D) & \text{se } B >= \text{MAX}(A,D) \\ \text{MAX}(A,D) & \text{se } B <= \text{MIN}(A,D) \\ A+D-B & \text{OTHERWISE} \end{cases}$$

FIG.7.

LOSS-LESS COMPRESSION OF STILL IMAGES AT ENHANCED SPEED

FIELD OF THE INVENTION

The present invention relates to a loss-less compression algorithm of a stream of pixel data being transferred from a source device to a receiver device relative to a two-dimensional still object or image, and in particular, to a method and hardware implementation architecture capable of speeding up the compression process.

BACKGROUND OF THE INVENTION

The LOCO-I loss-less compression algorithm for still images has been accepted for JPEG-LS standardization, and is applied for transferring pixel data relative to still images from a source device to a receiver device through a variety of media. The LOCO-I JPEG-LS algorithm is described in the following papers: M. J. Weinberger, G. Seroussi and G. Sapiro, "LOCO-I: A Low Complexity, Context Based, Loss-less Image Compression Algorithm", Proc. of the 1996 Data Compression Conference (DCC '96), SnowBird, Utah, pp. 141–149, March 1996; and M. J. Weinberger, G. Seroussi and G. Sapiro, "The LOCO-I Loss-less Image Compression Algorithm: Principles And Standardization Into JPEG-LS", IEEE Transactions on image processing, vol. 9 No. 8, pp. 1309–1324, August 2000.

A hardware implementation based on the LOCO-I algorithm, but modified to lower implementation complexity, is described in the article M. Klimesh, V. Stanton and D. Watola, "Hardware Implementation Of A Loss-less Image Compression Algorithm Using A Field Programmable Gate Array", Feb. 15, 2001.

Figure 1:
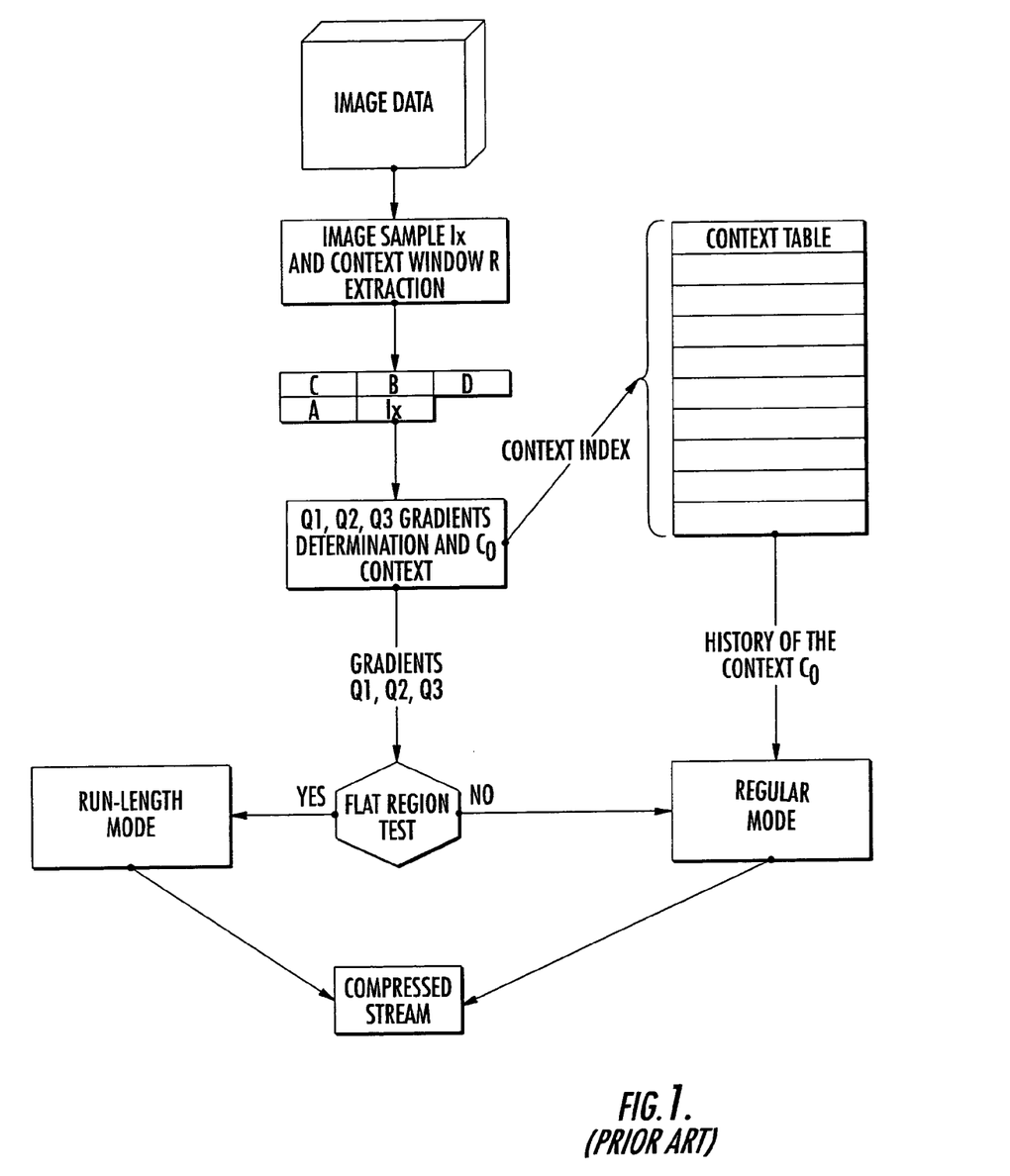
FIG. 1 is a scheme of the LOCO-I algorithm according to the prior art.

The basic LOCO-I algorithm is illustrated in FIG. 1. Each pixel is analyzed within its neighborhood or context window. The subsequent encoding of the circuit pixel is carried out according to either a Run-Length Mode if the context window is found to be substantially uniform in the grey level, or if this is not the case, the encoding follows a Regular Mode. This is according to which context table storing the history of the previous encodings of the pixels belonging to the context window is read for calculating a prediction value, and finally the difference between the circuit pixel and the calculated predicted value is encoded.

As may be noted from the scheme of FIG. 1, the context window for processing the current pixel Ix is defined to include the pixel Ra preceding the currently processed pixel Ix on the same row and the three neighboring pixels Rb, Rc and Rd belonging to the preceding row in terms of the standard sequence of scanning by rows of pixels of a two-dimensional object or image.

Figure 2:
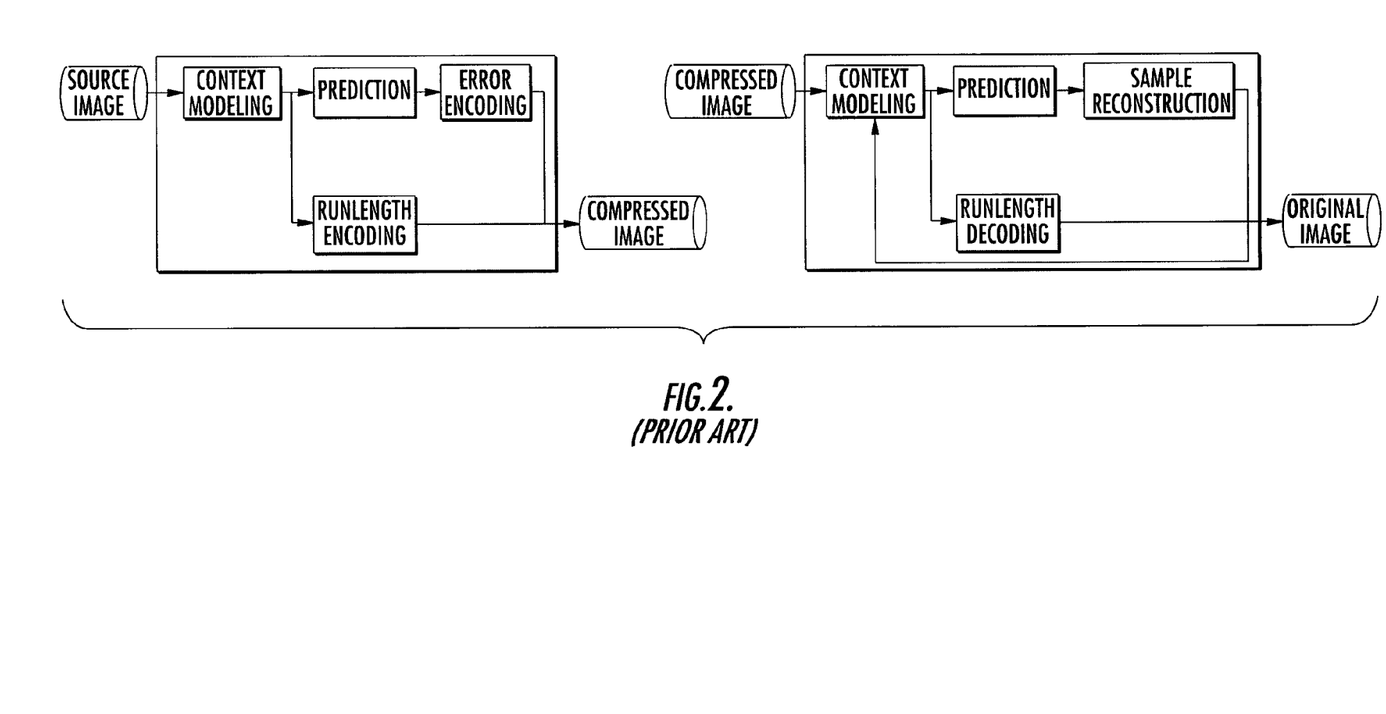
FIG. 2 is a block diagram of the architecture for a standard JPEG-LS encoder and decoder, based on the LOCO-I algorithm, according to the prior art.

The hardware architecture of a standard JPEG-LS encoder/decoder implementing a loss-less compression algorithm, such as the LOCO-I, is shown in FIG. 2. The flow chart of the steps that are performed in a JPEG-LS LOCO-I encoder is detailed in FIG. 3, when the formation of the context window for a current pixel S to be processed that includes the last processed pixel A and the triplet of neighboring pixels CBD belonging to the preceding row that has already being scanned, is indicated.

Figure 3:
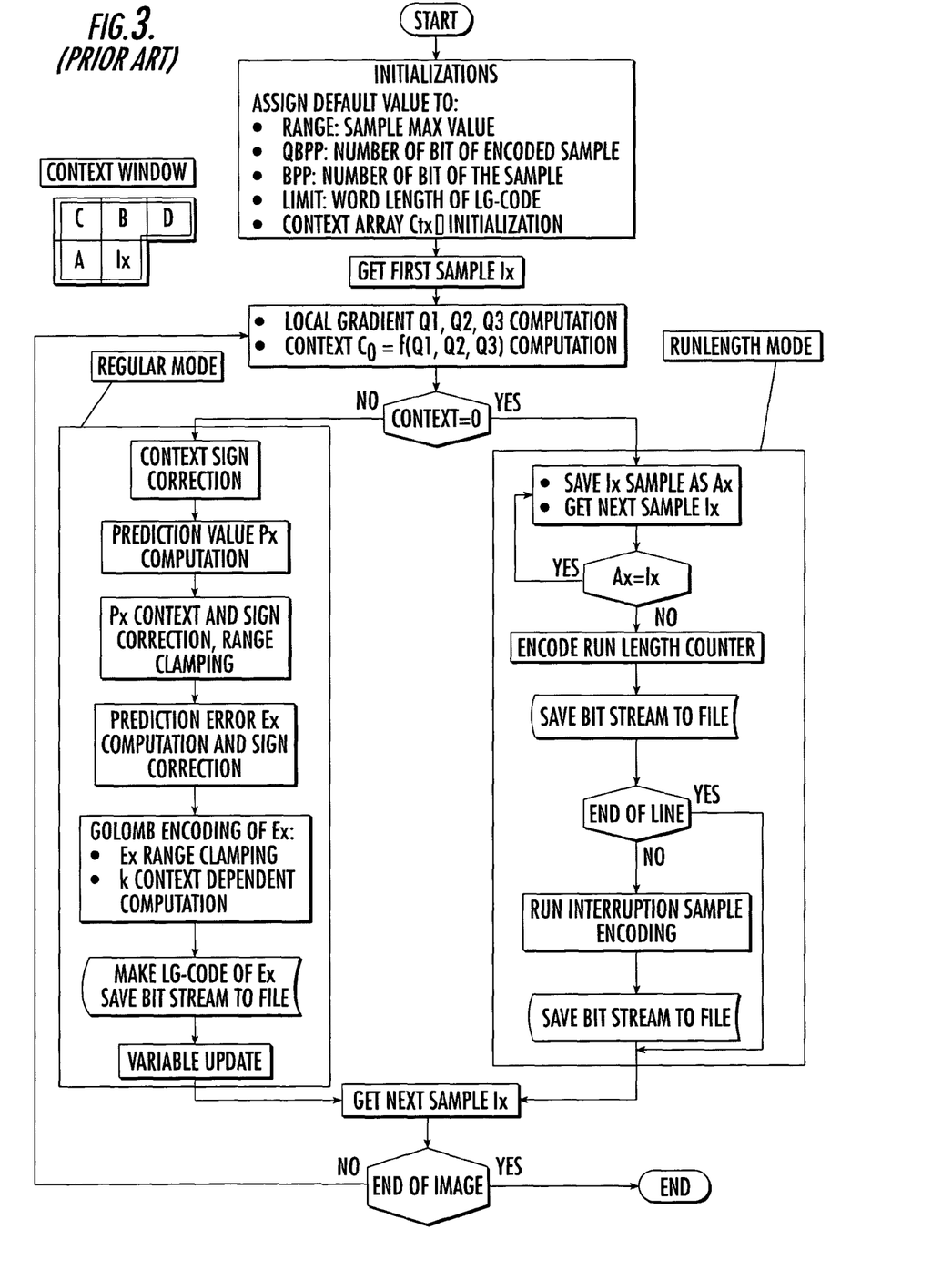
FIG. 3 is a flow chart illustrating the JPEG-LS standard encoding routine according to the LOCO-I compression algorithm according to the prior art.

As may be observed, after initialization, a sample Ix (pixel S of the context window), following the last processed sample (pixel A of the context window), is acquired. The computation starts with the calculation of local gradients: $Q1=D-B$; $Q2=B-C$; $Q3=C-A$ relative to the acquired value Ix of the pixel S followed by the computation of the context value relative to the current pixel as a function of the calculated gradients: $C_o=f(Q1, Q2, Q3)$.

The result of the computation of the context value is compared with the threshold to determine whether the context value for the current pixel is either null or not null (i.e., significant). If the context value is found to be null, the Run-Length Mode encoding routine is performed, according to the sequence of steps specified in the box Run-Length Mode of the flow chart of FIG. 3.

Conversely, if the context value for the current pixel is found not to be significant, the Regular Mode encoding routine according to the sequence of steps specified in the box Regular Mode of the flow chart of FIG. 3 is performed for encoding the difference between the value Ix of the current pixel S and the calculated predicted value.

Apart from the provision, in the loss-less LOCO-I compressing algorithm presently being used, of the possibility of encoding relatively long sequences of pixels in a very efficient Run-Length Mode, as long as a substantial identity of progressively scanned pixels continues to be verified, the regular compression mode when a substantial identity of a newly scanned pixel with the preceding and neighboring one is no longer verified implements a pixel by pixel processing both in encoding as well as in decoding. As in any transfer of data, speed is of paramount importance.

SUMMARY OF THE INVENTION

The speed of a compression and decompression process of a stream of pixel data, in a loss-less manner, may be increased by a factor that may ideally reach up to 100% of the speed that would be observed by using a known method of processing according to a standard LOCO-I algorithm, by allowing, whenever a Run-Length Mode is not applicable to the currently scanned pixel, a parallel processing of a pair of pixels instead of single pixel according to the known methods.

This important result is achieved with a negligible decrement of the compression rate by duplicating the buffer memory space in order to store two context tables instead of a single one.

A method in accordance with the present invention is for compressing a stream of pixel data relative a two-dimensional object, and pixels of which are scanned by rows from a source device to a receiver device. The method may comprise calculating a context value representative of a level of differences among pixels that are included with a pixel currently being processed within a context window having predefined dimensions, and the pixel currently being processed includes a last processed pixel and a triplet of neighboring pixels belonging to a row preceding the row being scanned and to which the current pixel belongs.

The method may further include defining an extended context window to include a pair of pixels following a last encoded pixel on the row being scanned and the respective triplets of neighboring pixels belonging to the preceding row, and defining a first distinct context array of pixels of the extended context window for the pixel of the pair immediately following the last encoded pixel, and a second context array of pixels of the extended context window for the other pixel of the pair.

A set of local gradients relative to each pixel of the pair based upon acquired values thereof may be calculated, and the method may further include calculating from the calculated local gradients an extended context value relative to each pixel of the pair.

The extended context value relative to a first pixel immediately following the last encoded pixel may be compared with an extended threshold. If the extended context value is less than the extended threshold, then the method includes encoding the first and second pixels of the pair. If the extended context value relative to the first pixel of the pair exceeds the extended threshold, then the method carries out simultaneously a parallel processing and encoding of both pixels according to an encoding routine reading data from distinct context tables of stored statistics of previous predictor errors relative to the pixels of the extended context window for the respective pixels of the pair.

The method may further comprise repeating the calculating, defining and comparing steps for a next pair of pixels until completing the scanning of a last row of pixels. The encoding may be based upon a Run-Length Mode if the extended context value is less than the extended threshold.

Calculating the context value within the context window may comprise the following: if the context value is less than a threshold, then encoding a sequence of identical pixels according to a Run-Length Mode into a pair of values. The pair of values respectively correspond to a count and an interruption error. The count is a number of identical pixels in the encoded sequence, and the interruption error is a difference between an initial pixel and a pixel that breaks a sequence of identical pixels. If the context value exceeds the threshold, then a predicted value of the current pixel is calculated based on data read from a context table. This data counters statistics of previous prediction errors relative to the pixels of the context window. A difference between a value of the current pixel and the calculated predicted value is also encoded according to an encoding algorithm.

The encoding algorithm may comprise a limited length Golomb code, and the local gradients relative to a pixel may be calculated by an arithmetic difference among the pixels belonging to the extended context window. The extended context value relative to a pixel may be calculated based upon a mapping of three gradients into a unique value.

Other aspects of the present invention are directed to a compression algorithm implementing the method as described above, and a circuit for executing the compression algorithm.

DETAILED DESCRIPTION OF THE PREFERRED EMBODIMENTS

Figure 4:
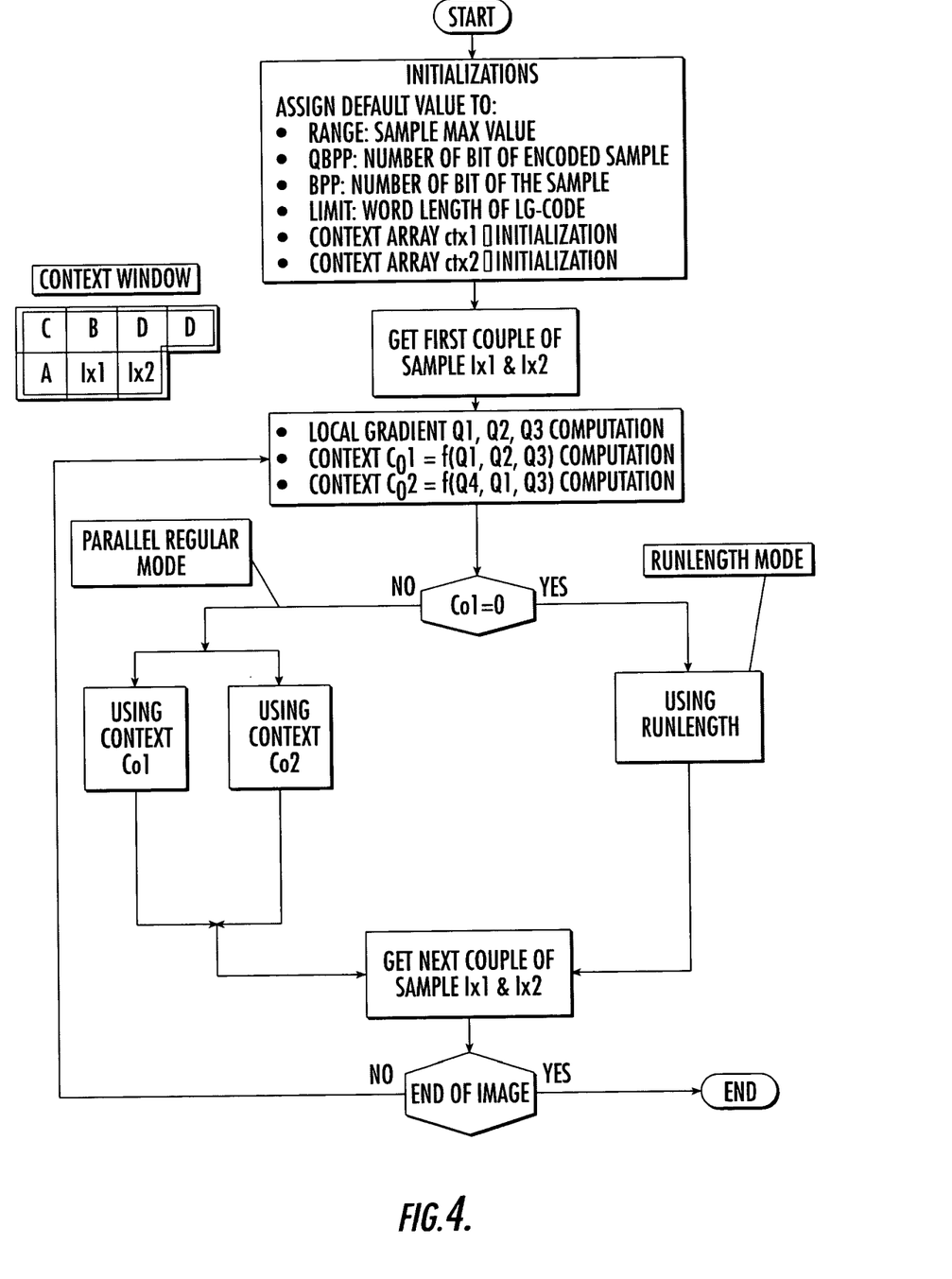
FIG. 4 is a flow chart illustrating the JPEG-LS encoding implementing a loss-less compression algorithm whereby in the Regular Mode encoding two pixels are processed in parallel and encoded at the same time according to the present invention.

The basic scheme of the loss-less compression algorithm for enhanced speed of the present invention, compatible with the standard JPEG-LS, is shown in FIG. 4. The figure also illustrates the extended context window for a selected pair of adjacent pixels S1, S2 to be processed. The context window includes the last processed pixel A that precedes the selected pair of pixels on the same row being scanned, and the pixels CBDE that form the two respective triplets of neighboring pixels: CBD and BDD for the two pixels S1 and S2 to be processed.

The variable and parameter initializations are carried out for the context arrays of pixels relative to the first sample (pixel S1) Ix1 of the considered pair, and for the second sample (pixel S2) Ix2 of the considered pair. Thereafter, the value of the two samples Ix1 and Ix2 are acquired.

The computation starts with the calculation of local gradients $Q1=D-B$, $Q2=B-C$, $Q3=C-A$, and $Q4=E-D$ relative to the two pixels considered S1 and S2 (the context window), followed by the calculation of a context value for the first pixel $C_o1=f(Q1, Q2, Q3)$ as a function of the local gradients Q1, Q2, Q3 relative to the pixel S1 and of a context value for the second pixel $C_o2=f(Q1, Q3, Q4)$ as a function of the local gradients Q1, Q3, Q4 relative to the pixel S2.

As far as the calculation of context value is concerned, the JPEG-LS standard does not define a function to be used. It is only requested that the mapping of the three gradients into a unique value be implemented. In this study the formulas that have been used were:

$$C_o1=Q1*81+Q2*9+Q3 \text{ and } C_o2=Q1*81+Q3*9+Q4.$$

The context value of the first pixel S1, that is, of the pixel following immediately the last encoded pixel A, is tested and if it is found to be null, both pixels of the current pair are processed and encoded according to the Run-Length Mode routine.

If the test of the context value of the first pixel S1 of the pair of pixels S1–S2 doe not give a null result, both pixels are simultaneously processed according to a Regular Mode, in parallel, using the respective context value for processing and encoding the two pixels and a respective context table.

Figure 5:
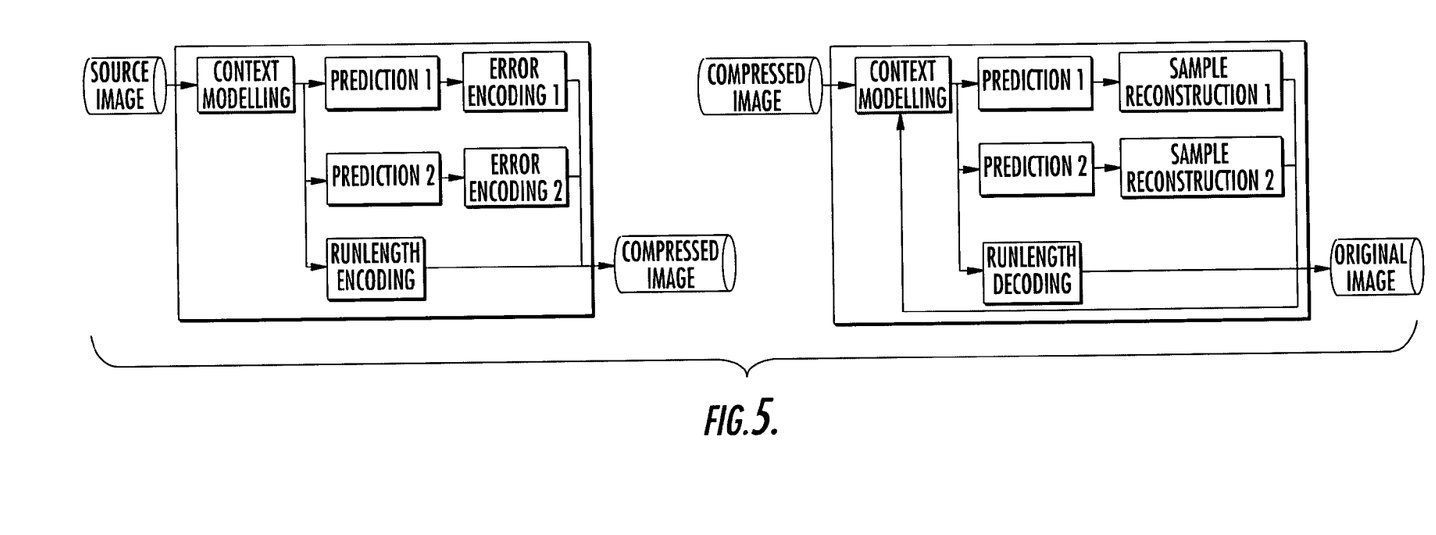
FIG. 5 is a block diagram of the architecture of a standard JPEG-LS encoder and decoder according to the present invention.

FIG. 5 is a block diagram of the architecture of a standard JPEG-LS encoder and decoder in accordance with the present invention. Basically the differences with the known LOCO-I compression algorithm is the definition of an extended context window including a first sample Ix1 and a second sample Ix2 corresponding to the pixel S1 immediately following the last processed pixel A and to the following pixel S2, and the additional relative neighboring pixel E needed to calculate the quantized gradient for the second pixel S2 of the selected pair S1–S2.

Figure 6:
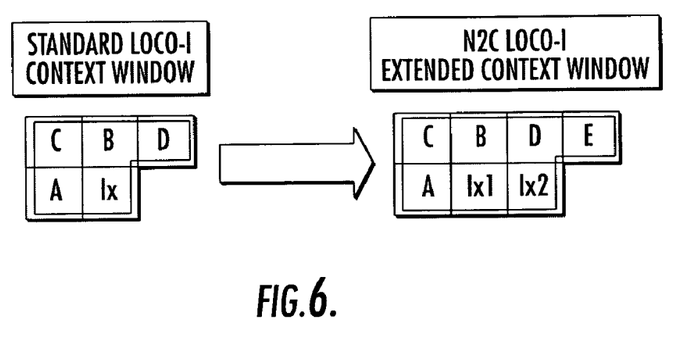
FIG. 6 illustrates for easy comparison the context window according to the standard LOCO-I algorithm and the extended context window used in the algorithm of the present invention.

FIG. 6 illustrates for comparison the context window of the known LOCO-I compression algorithm and the extended context window of the novel compression algorithm of the invention. According to the algorithm of the invention, the gradients that are calculated for each selected pair of samples are four: $Q1=D-B$, $Q2=B-C$, $Q3=C-A$ and $Q4=E-D$.

Moreover, two distinct context values relative to the first and the second sampled pixels of the pair are calculated, namely as $C_o1=f(Q1, Q2, Q3)$ and $C_o2=f(Q4, Q1, Q3)$ Only the context value $C_o1$ is tested to determine the processing (encoding) of the two samples of the selected pair according to a Run-Length Mode or according to a Regular Mode.

Figure 7:
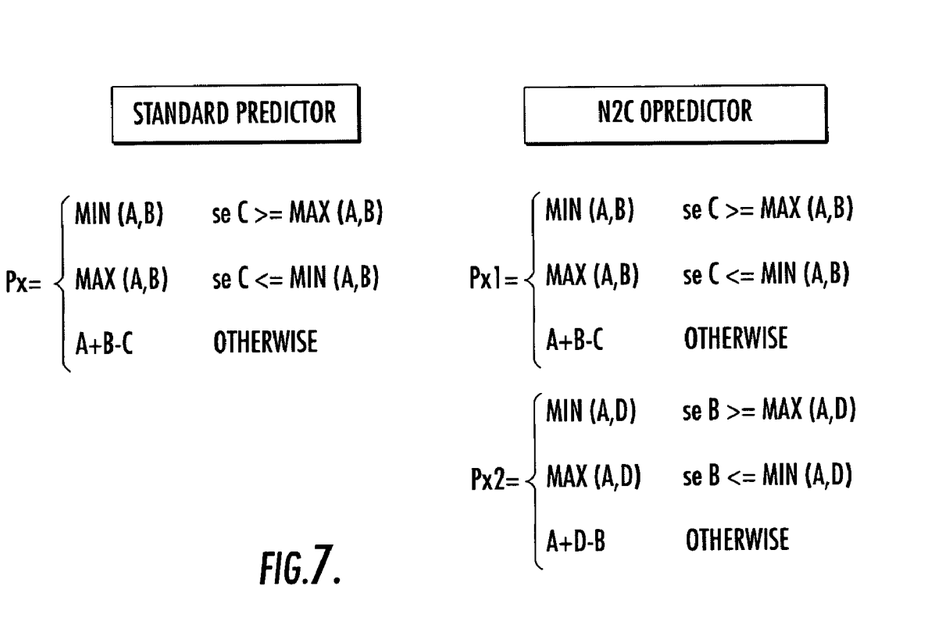
FIG. 7 illustrates for an easy comparison the steps for generating the predicted value of the current pixel according to the standard LOCO-I algorithm, and the predicted values of the current pair of pixels according to the compressing algorithm of the present invention.

The criteria for the computation of the predictor according to the known LOCO-I algorithm and according to the algorithm of this invention are set forth for an easy comparison in FIG. 7. As may be observed by comparing the two algorithms, in the Regular Mode processing, while the prediction value for the first sample Px1 is computed in the same manner as done in the known LOCO-I algorithm, the prediction value for the second sample S2 is computed by using the values established for the respective triplet of neighboring pixels ABD.

Of course, the context table that is used in the Regular Mode encoding routine (FIG. 1) that stores the statistics relative to a certain context, must be duplicated in order to correlate the two adjacent pixels selected for processing.

It has been verified that the algorithm of this invention based on a parallel processing of two pixels at a time (according to a Regular Mode) may reduce the processing time by a factor ranging from about 35% to up 50%, depending on the type of images used for a comparative testing.

This is achieved while retaining a substantial loss-less character of the compression and with a negligible decrement of the compression ratio that remains in the neighborhood of 0.1%. These significant and variable results are achieved at the expense of an increase of the memory that is dictated by the need to respectively store two distinct context tables for the first and second pixels simultaneously being processed. While a standard LOCO-I algorithm requires 2.5 Kbytes of memory, the compression algorithm of enhanced speed in accordance with the present invention requires 4.8 Kbytes.

That which is claimed is:

1. A method of compressing a stream of pixel data relative a two-dimensional object, pixels of which are scanned by rows from a source device to a receiver device, the method comprising:
    calculating a context value representative of a level of differences among pixels that are included with a pixel currently being processed within a context window having predefined dimensions, the pixel currently being processed includes a last processed pixel and a triplet of neighboring pixels belonging to a row preceding the row being scanned and to which the current pixel belongs;
    defining an extended context window to include a pair of pixels following a last encoded pixel on the row being scanned and the respective triplets of neighboring pixels belonging to the preceding row;
    defining a first distinct context array of pixels of the extended context window for the pixel of the pair immediately following the last encoded pixel, and a second context array of pixels of the extended context window for the other pixel of the pair;
    calculating a set of local gradients relative to each pixel of the pair based upon acquired values thereof;
    calculating from the calculated local gradients an extended context value relative to each pixel of the pair; and
    comparing the extended context value relative to a first pixel immediately following the last encoded pixel with an extended threshold, the comparing comprising:
        if the extended context value is less than the extended threshold, then encoding the first and second pixels of the pair, and
        if the extended context value relative to the first pixel of the pair exceeds the extended threshold, then carrying out simultaneously a parallel processing and encoding of both pixels according to an encoding routine reading data from distinct context tables of stored statistics of previous predictor errors relative to the pixels of the extended context window for the respective pixels of the pair.

2. A method according to claim 1, further comprising repeating the calculating, defining and comparing steps for a next pair of pixels until completing the scanning of a last row of pixels.

3. A method according to claim 1, wherein the encoding is based upon a Run-Length Mode if the extended context value is less than the extended threshold.

4. A method according to claim 1, wherein calculating the context value within the context window comprises:
    if the context value is less than a threshold, then encoding a sequence of identical pixels according to a Run-Length Mode into a pair of values, the pair of values respectively corresponding to a count and an interruption error, wherein the count is a number of identical pixels in the encoded sequence and the interruption error is a difference between an initial pixel and a pixel that breaks a sequence of identical pixels; and
    if the context value exceeds the threshold, then calculating a predicted value of the current pixel based on data read from a context table, the data countering statistics of previous prediction errors relative to the pixels of the context window, and encoding a difference between a value of the current pixel and the calculated predicted value according to an encoding algorithm.

5. A method according to claim 4, wherein the encoding algorithm comprises a limited length Golomb code.

6. A method according to claim 1, wherein the local gradients relative to a pixel are calculated by an arithmetic difference among the pixels belonging to the extended context window.

7. A method according to claim 6, wherein the extended context value relative to a pixel is calculated based upon a mapping of three gradients into a unique value.

8. A method according to claim 1, wherein the calculating, defining and comparing steps are implemented in accordance with a LOCO-I algorithm.

9. A method of compressing a stream of pixel data comprising:
    calculating a context value representative of a level of differences among pixels that are included with a pixel currently being processed within a context window having predefined dimensions, the pixel currently being processed includes a last processed pixel and a triplet of neighboring pixels belonging to a row preceding the row being scanned and to which the current pixel belongs;
    defining an extended context window to include a pair of pixels following a last encoded pixel on the row being scanned and the respective triplets of neighboring pixels belonging to the preceding row;
    defining a first distinct context array of pixels of the extended context window for the pixel of the pair immediately following the last encoded pixel, and a second context array of pixels of the extended context window for the other pixel of the pair;
    calculating an extended context value relative to each pixel of the pair; and comparing the extended context value relative to a first pixel immediately following the last encoded pixel with an extended threshold, the comparing comprising
if the extended context value is less than the extended threshold, then encoding the first and second pixels of the pair, and
if the extended context value relative to the first pixel of the pair exceeds the extended threshold, then carrying out simultaneously a parallel processing and encoding of both pixels according to an encoding routine reading data from distinct context tables of stored statistics.

10. A method according to claim 9, wherein the stored statistics are of previous predictor errors relative to the pixels of the extended context window for the respective pixels of the pair.

11. A method according to claim 9, further comprising repeating the calculating, defining and comparing steps for a next pair of pixels until completing the scanning of a last row of pixels.

12. A method according to claim 9, wherein the encoding is based upon a Run-Length Mode if the extended context value is less than the extended threshold.

13. A method according to claim 9, further comprising acquiring values of the pair of pixels; and wherein calculating the extended context value is based upon calculation of a set of local gradients relative to each pixel of the pair based upon the acquired values thereof.

14. A method according to claim 9, wherein calculating the context value within the context window comprises:
if the context value is less than a threshold, then encoding a sequence of identical pixels into a pair of values, the pair of values respectively corresponding to a count and an interruption error, wherein the count is a number of identical pixels in the encoded sequence and the interruption error is a difference between an initial pixel and a pixel that breaks a sequence of identical pixels; and
if the context value exceeds the threshold, then calculating a predicted value of the current pixel based on data read from a context table, the data countering statistics of previous prediction errors relative to the pixels of the context window, and encoding a difference between a value of the current pixel and the calculated predicted value according to an encoding algorithm.

15. A method according to claim 9, wherein the encoding is based upon a Run-Length Mode if the context value is less than the threshold.

16. A method according to claim 9, wherein the local gradients relative to a pixel are calculated by an arithmetic difference among the pixels belonging to the extended context window.

17. A method according to claim 16, wherein the extended context value relative to a pixel is calculated based upon a mapping of three gradients into a unique value.

18. A compression algorithm for compressing a stream of pixel data, pixels of which are scanned by rows from a source device to a receiver device, the compression algorithm comprising:
a first module for calculating a context value representative of a level of differences among pixels that are included with a pixel currently being processed within a context window having predefined dimensions, the pixel currently being processed includes a last processed pixel and a triplet of neighboring pixels belonging to a row preceding the row being scanned and to which the current pixel belongs;
a second module for defining an extended context window to include a pair of pixels following a last encoded pixel on the row being scanned and the respective triplets of neighboring pixels belonging to the preceding row;
a third module for defining a first distinct context array of pixels of the context window for the pixel of the pair immediately following the last encoded pixel, and a second context array of pixels of the context window for the other pixel of the pair;
a fourth module for calculating an extended context value relative to each pixel of the pair; and
a fifth module for comparing the extended context value relative to a first pixel immediately following the last encoded pixel with an extended threshold, the comparing comprising
if the extended context value is less than the extended threshold, then encoding the first and second pixels of the pair, and
if the extended context value relative to the first pixel of the pair exceeds the extended threshold, then carrying out simultaneously a parallel processing and encoding of both pixels according to an encoding routine reading data from distinct context tables of stored statistics.

19. A compression algorithm according to claim 18, wherein the stored statistics in the fifth module are of previous predictor errors relative to the pixels of the extended context window for the respective pixels of the pair.

20. A compression algorithm according to claim 18, further comprising a sixth module for causing the compression algorithm to repeat the process for a next pair of pixels until completing the scanning of a last row of pixels.

21. A compression algorithm according to claim 18, wherein the encoding in the fifth module is based upon a Run-Length Mode if the extended context value is less than the extended threshold.

22. A compression algorithm according to claim 18, wherein calculating the context value within the context window in the first module comprises:
if the context value is less than a threshold, then encoding a sequence of identical pixels into a pair of values, the pair of values respectively corresponding to a count and an interruption error, wherein the count is a number of identical pixels in the encoded sequence and the interruption error is a difference between an initial pixel and a pixel that breaks a sequence of identical pixels; and
if the context value exceeds the threshold, then calculating a predicted value of the current pixel based on data read from a context table, the data countering statistics of previous prediction errors relative to the pixels of the context window, and encoding a difference between a value of the current pixel and the calculated predicted value according to an encoding algorithm.

23. A compression algorithm according to claim 22, wherein the encoding in the first module is based upon a Run-Length Mode if the context value is less than the threshold.

24. A compression algorithm according to claim 18, wherein the local gradients relative to a pixel are calculated by an arithmetic difference among the pixels belonging to the extended context window.

25. An encoder/decoder circuit comprising:
an input for receiving a stream of pixel data; and
a processor for executing a compression algorithm for processing the stream of pixel data, said processor performing the following functions calculating a context value representative of a level of differences among pixels that are included with a pixel currently being processed within a context window having predefined dimensions, the pixel currently being processed includes a last processed pixel and a triplet of neighboring pixels belonging to a row preceding the row being scanned and to which the current pixel belongs, defining an extended context window to include a pair of pixels following a last encoded pixel on the row being scanned and the respective triplets of neighboring pixels belonging to the preceding row, defining a first distinct context array of pixels of the extended context window for the pixel of the pair immediately following the last encoded pixel, and a second context array of pixels of the extended context window for the other pixel of the pair, calculating an extended context value relative to each pixel of the pair, and comparing the extended context value relative to a first pixel immediately following the last encoded pixel with an extended threshold, the comparing comprising if the extended context value is less than the extended threshold, then encoding the first and second pixels of the pair, and if the extended context value relative to the first pixel of the pair exceeds the extended threshold, then carrying out simultaneously a parallel processing and encoding of both pixels according to an encoding routine reading data from distinct context tables of stored statistics.

26. An encoder/decoder circuit according to claim 25, further comprising a memory connected to said processor for storing the statistics, and wherein the statistics are of previous predictor errors relative to the pixels of the extended context window for the respective pixels of the pair.

27. An encoder/decoder circuit according to claim 25, wherein said processor repeating the calculating, defining and comparing steps for a next pair of pixels until completing the scanning of a last row of pixels.

28. An encoder/decoder circuit according to claim 25, wherein the encoding is based upon a Run-Length Mode if the extended context value is less than the extended threshold.

29. An encoder/decoder circuit according to claim 25, said processor further acquires values of the pair of pixels, and wherein calculating the extended context value is based upon calculation of a set of local gradients relative to each pixel of the pair based upon the acquired values thereof.

30. An encoder/decoder circuit according to claim 25, wherein calculating the context value within the context window comprises:

if the context value is less than a threshold, then encoding a sequence of identical pixels into a pair of values, the pair of values respectively corresponding to a count and an interruption error, wherein the count is a number of identical pixels in the encoded sequence and the interruption error is a difference between an initial pixel and a pixel that breaks a sequence of identical pixels; and if the context value exceeds the threshold, then calculating a predicted value of the current pixel based on data read from a context table, the data countering statistics of previous prediction errors relative to the pixels of the context window, and encoding a difference between a value of the current pixel and the calculated predicted value according to an encoding algorithm.

31. An encoder/decoder circuit according to claim 30, wherein the encoding is based upon a Run-Length Mode if the context value is less than the threshold.

32. An encoder/decoder circuit according to claim 25, wherein the local gradients relative to a pixel are calculated by an arithmetic difference among the pixels belonging to the extended context window.

* * * * *